April 2, 1968 C. CREEVY ET AL 3,375,948
VENTED ENCLOSED GLASS AMPOULE AND METHOD OF MAKING IT
Filed Feb. 10, 1965
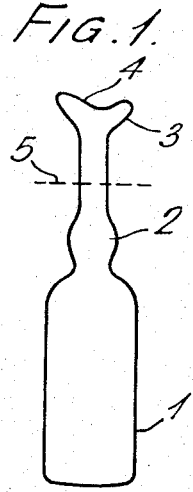
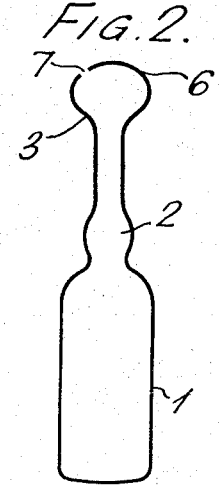
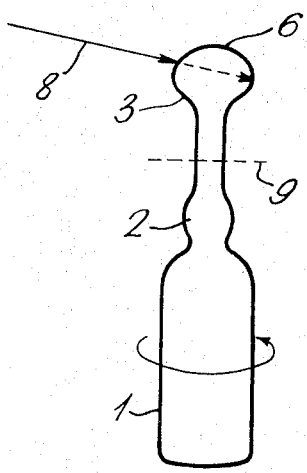
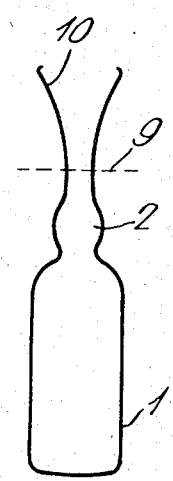
INVENTORS
CHARLES CREEVY
HENRY THOMAS CLARK
BY Bacon & Thomas
ATTORNEYS

United States Patent Office 3,375,948
Patented Apr. 2, 1968

3,375,948
VENTED ENCLOSED GLASS AMPOULE AND METHOD OF MAKING IT
Charles Creevy, Greenford, and Henry Thomas Clark, Chelsfield, England, assignors to Glaxo Laboratories Limited, Greenford, England, a British company
Filed Feb. 10, 1965, Ser. No. 431,554
Claims priority, application Great Britain, Feb. 12, 1964, 5,923/64
7 Claims. (Cl. 215—32)

ABSTRACT OF THE DISCLOSURE

A glass ampoule made by drawing glass tubing and fusing the top and bottom closed. The closed top is heat softened and the air pressure in the ampoule is raised by heating to prevent collapse of the soft top, then a small opening not over about .05 inch in diameter is made in the soft top by a narrow flame jet, the air pressure preventing entry of glass spicules into the ampoule. Then, or later, the top is heat softened and spun to form an upwardly open funnel top.

---

This invention concerns improvements in or relating to the manufacture of ampoules and is concerned both with methods of manufacturing ampoules and with the ampoules themselves.

Glass ampoules are widely used as containers for small doses of pharmaceutical products, the ampoules being filled and sealed by the pharmaceutical manufacturer and remaining so sealed until they are fractured immediately prior to use of their contents. It is a fundamental requirement that glass ampoules for such purposes must have a high degree of sterility before they are filled.

As is well known ampoules are made from drawn glass tubing which is washed and rinsed before use. FIGURE 1 of the accompanying drawings shows diagrammatically one known form of ampoule. The tube length is sealed at the bottom end of the ampoule which is then drawn into a shape comprising a generally cylindrical body 1, having a tapered portion 2 thereon which terminates in an outwardly flared or funnel shaped end 3. This end which is sealed off when the ampoule is severed from the stock has an inwardly curved or concave membrane 4 of glass closing the ampoule. This concave shaped membrane 4 is created by the air within the ampoule cooling down while the glass is still plastic and creating a sub-atmospheric pressure within the ampoule.

Due to this reduced pressure within the ampoule a substantial quantity of spicules of glass will always enter the ampoule as soon as its originally hermetically sealed surface is breached. In some instances these known ampoules have been pierced in the region of the funnel shaped end 4, and whether pierced or not the end of the ampoule has been cut off at 5 prior to filling to give access for a filling needle. In all cases substantial quantities of glass spicules have entered the ampoule, which has to be subjected to a lengthy and therefore costly cleansing and sterilizing procedure, and may also have to be flamed to remove the cut edges. In addition to the entry of glass spicules due to cutting and piercing the ampoules, the cutting step has frequently led to imperfections in the ampoules in the vicinity of the cut.

It will thus be apparent that the above known method of manufacturing ampoules ready for filling involves considerable time and expense in examining, washing and sterilizing them in addition to there being quite a high percentage of rejects.

It is one object of this invention to provide an improved method of manufacturing ampoules in which the level of contamination by glass spicules is substantially reduced as compared with the above mentioned known method.

According to the invention there is provided a method of manufacturing glass ampoules in which a hermetically sealed ampoule is drawn from glass tube, the pressure within the ampoule is raised while the glass at the top of the ampoule is in a plastic condition whereafter the top of the ampoule is pierced while the pressure within the ampoule is above atmospheric pressure.

We have found that by piercing a small bore hole in the top of the ampoule, which will generally be domed or convex, while the pressure inside the sealed and unpierced ampoule is above atmospheric pressure, a marked reduction in contamination by glass spicules is achieved.

Preferably the piercing of the top of the ampoule is effected during the initial manufacture of the ampoule from the glass tube and indeed immediately the top of the ampoule is seen to be assuming a convex or domed shape as a result of the rising internal pressure due to application of heat.

It is however possible for the sealed ampoules to be pierced at any time after manufacture by a narrow jet flame provided that before piercing the internal pressure is raised above atmospheric. It will be apparent that piercing during manufacture is preferred since the formation of the convex top is a readily visible indication that the pressure in the ampoule is above atmospheric; while if the ampoule has once cooled down it is only possible to estimate its pressure when reheating the top prior to piercing.

Ampoules manufactured in accordance with the invention not only have the advantage that the quantity of glass spicules entering them upon first breaching their surface is reduced but have the additional advantage that the hitherto usual step of cutting off the top end of the ampoules prior to filling—which step again caused glass spicules to enter the ampoule—can be avoided. We have found that such ampoules can readily be provided with an open funnel shaped top, which is smooth edged and free from peripheral beads or crevices which would tend to harbor dirt, impurities and bacteria.

According to a further feature of the invention therefore an open topped funnel is formed in the pierced top of an ampoule made by the method as set forth above. This funnel forming step may be performed by spinning the ampoule at high speed say of the order of 200 r.p.m. and directing a shaping flame at the pierced top surface thereof to form the funnel.

Ampoules having such funnels can when required be readily filled automatically. After filling the ampoule can be sealed by a simple flame sealing and drawing off step, which seals the end and draws away the funnel portion thus entirely obviating the hitherto usual step of cutting the top of the ampoule from the body.

FIGURES 2, 3 and 4 of the accompanying drawings show diagrammatically and respectively successive stages in the manufacture of ampoules according to the present invention.

In one preferred method of manufacturing ampoules according to this invention normal glass tubing as conventionally used is employed. The tubing is washed and then fabricated into an ampoule body in a manner generally known per se up to the stage of sealing the top.

As shown in FIGURE 2 this ampoule body has a cylindrical portion 1 and a tapered portion 2 thereon, with a closed outwardly flared or funnel shaped end 3.

At this stage of the fabrication additional heat is applied to the ampoule while the glass is still in a plastic condition and the consequent increase in pressure within the sealed ampoule causes the top 6 of the ampoule to become convex or dome shaped.

When this convex or dome shaped top 6 is formed and while the pressure in the ampoule is still above atmospheric pressure before the ampoule has been allowed to cool down to any substantial extent, a small bore cutting flame of hydrogen and oxygen is applied to the domed or convex top 6 to pierce a single small hole 7 of a size preferably not greater than 0.05" in diameter therein.

This puncture serves to equalize the air pressure and since it was effected while the internal pressure was elevated, examination shows that only a very small quantity of glass spicules, as compared with ampoules made by known methods, enter the ampoule. The ampoules are then annealed and packed in known manner.

Ampoules in their pierced conditions as shown in FIGURE 2 can be packed in batches, and transported to pharmaceutical manufacturers who can then readily form funnels in the top in a manner to be described. It will be appreciated that since the annealed ampoules have only one small hole 7 in them the likelihood of dust, fibres and other contamination entering them is greatly reduced as compared with known ampoules which are normally provided with open necks resulting from the cutting off of the concave surfaced top ends at 5 as shown in FIGURE 1.

When the ampoules are to be filled their pierced and domed tops 6 are opened into funnel shape by spinning the ampoules at a speed of about 200 r.p.m. while directing a shaping flame of hydrogen and oxygen 8 onto the domed top 6, as shown diagrammatically in FIGURE 3, to cause the glass membrane over the top to fuse and flow into a smooth and crevice free flared open funnel 10 (FIGURE 4).

The thus opened ampoules are then washed and sterilized whereafter they are filled and sealed by flaming below the neck of the funnel at about level 5 and simultaneously drawing off the funnel end 10 to produce the filled and sealed ampoules.

In order to provide an indication of the greatly reduced contamination of open funnel-topped ampoules made according to the invention as compared with known ampoules opened by cutting off the concave surfaced top end tests were carried out.

In these tests the known annealed open ampoules as provided by a manufacturer were cleaned by rinsing with a jet of water, and given another rinsing by refluxing in a vacuum chamber. Thereafter batches of wet ampoules were mechanically spun to free them of water and the cycle was repeated. The ampoules were then dried and sterilized in a sterilizing oven and were filled with a particle free distilled water and sealed.

The sealed ampoules were then examined with the unaided eye for spicule or fibre contamination and 3.5% were rejected as unsatisfactory. Similar ampoules were examined with a 2.5 magnification lens and a 15 watt fluorescent light source and the rejection rate was then 14%.

Ampoules made according to the invention with a pierced dome top and an open funnel formed therein were then cleaned by directing an air jet of filtered compressed air of 60 lbs. per sq. in. into the ampoule for 1½ seconds, the jet needle being so designed as to produce an upwardly directed spiral of air emerging from the ampoule. This step served to remove any fibre or spicule contamination which might have entered the ampoule due to the piercing of its top and its storage prior to formation of the funnel.

Sterilized ampoules cleaned by this much shorter procedure were then filled with particle free distilled water and sealed and were then examined for contamination both with the unaided eye, and with a 2.5 magnifying lens and a 15 watt fluorescent light source. The rate of rejects in examination by the unaided eye was 0.15% compared with 3.5% for the known ampoules, while with the magnified examination the rate was 0.59% compared with 14% for the known ampoules.

It will thus be seen that there has been provided a method of manufacturing ampoules which enables a substantial reduction in their contamination to be achieved, and which furthermore enables production costs in the supply of ampoules filled with pharmaceuticals to be reduced by reducing the rate of rejects of contaminated ampoules and by simplifying the cleaning and sterilizing procedure to which the ampoules have to be subjected before filling.

What is claimed is:

1. In the method of making glass ampoules formed by heating and drawing glass tubing and hermetically sealing the tops and bottoms thereof, the improvement comprising the steps of: maintaining the sealed top of an ampoule in heat softened condition; raising the internal pressure of said ampoule above atmospheric pressure, by heating said ampoule and thereby heating and expanding air sealed therein, sufficiently to hold said heat softened top against inward collapse; and piercing said heat softened top to provide a small opening therethrough, said internal pressure serving to minimize entry of glass spicules into said ampoule during said piercing step.

2. The method of claim 1 wherein said internal pressure is raised sufficiently to form and maintain said heat softened top in upwardly domed condition.

3. The method of claim 1 wherein said piercing step is performed by directing a narrow jet flame onto said heat softened top.

4. The method of claim 1 wherein the size of said pierced opening is held to not exceed about .05 inch.

5. The method of claim 1 including the further step of forming said pierced top into an upwardly open funnel.

6. The method of claim 5 wherein said further step is performed by directing a shaping flame to said pierced top while spinning said ampoule about an upright axis at high speed.

7. A glass ampoule having a closed bottom and a dome-shaped integral top, said dome-shaped top having a small vent opening therethrough, said opening having a diameter not exceeding about .05 inch.

References Cited

UNITED STATES PATENTS

| | | | |
|---|---|---|---|
| 1,409,847 | 3/1922 | Gray | 65—285 X |
| 2,464,765 | 3/1949 | Palmer | 65—108 X |

FOREIGN PATENTS

| | | |
|---|---|---|
| 572,176 | 9/1945 | Great Britain. |

DONALL H. SYLVESTER, *Primary Examiner.*

A. D. KELLOGG, *Examiner.*